United States Patent [19]

Argyle et al.

[11] 3,911,411

[45] Oct. 7, 1975

[54] MAGNETIC DOMAIN SYSTEMS USING DIFFERENT TYPES OF DOMAINS

[75] Inventors: Bernell E. Argyle, Putnam Valley; John C. DeLuca, Richmond Hills, both of N.Y.

[73] Assignee: International Business Machines Corporation, Armonk, N.Y.

[22] Filed: Dec. 29, 1972

[21] Appl. No.: 319,130

[52] U.S. Cl......340/174TF; 340/174SR; 340/174YC

[51] Int. Cl.$^2$ .................... G11C 11/14; G11C 19/08

[58] Field of Search .. 340/174 TF, 174 SR, 174 YC

[56] References Cited

UNITED STATES PATENTS

| | | | |
|---|---|---|---|
| 3,526,883 | 9/1970 | Tabor | 340/174 TF |
| 3,643,238 | 2/1972 | Bobeck et al. | 340/174 TF |
| 3,662,359 | 5/1972 | Genovese | 340/174 TF |
| 3,676,872 | 7/1972 | Lock | 340/174 TF |
| 3,701,127 | 10/1972 | Bobeck et al. | 340/174 TF |
| 3,701,129 | 10/1972 | Copeland | 340/174 TF |
| 3,728,697 | 4/1973 | Heinz | 340/174 TF |

OTHER PUBLICATIONS

Journal of Applied Physics, "Domain Behavior in Some Transparent Magnetic Oxides," by Sherwood et al., Vol. 30, No. 2, pp. 217–225.

American Institute of Physics, "A New Type of Cylindrical Magnetic Domain (Hard Bubble), by Tabor et al.; 1972; pp. 442–443.

*Primary Examiner*—Stanley M. Urynowicz, Jr.
*Attorney, Agent, or Firm*—Bernard N. Wiener; Jackson E. Stanland

[57] ABSTRACT

A magnetic bubble domain system using dual size bubble domains which can exist in a magnetic sheet at the same time, and which can be manipulated without changing their character. Additionally, they can be changed from one to another and back again in a very simple way. Means are shown for generating bubbles having two different sizes, for switching one domain to the other and vice versa, for propagating the domains, and for sensing them. A particularly useful display is also shown.

29 Claims, 11 Drawing Figures

GENERATION

MAGNETIC DOMAIN SYSTEMS USING DIFFERENT TYPES OF DOMAINS

BACKGROUND OF THE INVENTION

1. Field of the Invention

This invention relates to magnetic bubble domain systems and more particularly to bubble domain systems using two different types of bubble domains, where the two different domains are characterized by having different effective diameters.

2. Description of the Prior Art

Magnetic bubble domain systems are known in the art as exemplified by U.S. Pats. Nos. 3,701,125 and 3,689,902. In such systems, magnetic domains comprising a single domain wall which is closed upon itself and of generally cylindrical shape are used. These domains have magnetization perpendicular to the magnetic medium in which they exist and oppositely directed to the magnetization of the medium. The magnetization in the domain wall is generally in the plane of the magnetic medium and in the same direction throughout the domain wall periphery.

Systems using the aforementioned domains have been provided and have utilized many functions, including storage, writing, reading, splitting, propagation, annihilation, generation, etc. In these systems information is generally presented as the presence and absence of bubble domains, which, of course, lends itself to binary data uses.

While such prior art systems are very useful, the present invention seeks to use a newly discovered phenomenon that at least two types of magnetic bubble domains exist in the same magnetic medium simultaneously and that these two different domain types have dissimilar properties which serve to distinguish them from one another. The first of these domain types is characterized as a type A domain which has a larger diameter than a type B domain. Further, the type A domain has a more clearly defined wall when observed by Faraday transmission than a type B domain which exhibits a hazy wall outline when characterized by Faraday transmission. These two domains can exist in the same magnetic medium under the same bias field and can be manipulated without changing their character. In addition, these domains can be reproducibly changed to one another and back through the use of very simple means. Even when expanded into strip domains, the A domain strips are longer than the B domain strips.

The existence of domains having different properties allows the storage of information as the presence of both types of domains, rather than as the presence of a domain and the absence of a domain as is usually the case. This allows for greater flexibility in device design in possible applications not heretofore pursued.

Accordingly, it is a primary object of the present invention to provide an apparatus using magnetic bubble domains having different properties.

It is another object of this invention to provide an apparatus for magnetic bubble domain systems in which two types of magnetic bubble domains are maintained in the same magnetic medium.

It is a further object of this invention to provide an apparatus in which two different types of bubble domains can be used for information representation in the same magnetic medium wherein each can be sensed according to its own properties.

It is a still further object of this invention to provide a magnetic bubble domain system which is stable and which uses two different types of bubble domains, exploiting conventionally used structures to provide numerous functions.

It is another object of this invention to provide a magnetic bubble domain apparatus in which two different types of bubble domains are utilized and in which different size domains can be readily sensed.

It is another object of this invention to provide a display using magnetic bubble domains of different types.

SUMMARY OF THE INVENTION

Broadly, a magnetic system is provided in which different types of magnetic bubble domains are used. A first type (A) includes those domains which have a larger domain diameter and which have very well defined domain walls, as viewed by Faraday (magneto-optic) optical systems. The second type (B) of domain has a smaller "effective" diameter and has a domain wall which appears hazy when viewed using Faraday or double Faraday apparatus. These domains coexist in the same magnetic sheet under the same bias field conditions, and can be manipulated easily without changing their character. Additionally, a type A domain can be changed to a type B domain reproducibly, while a type B domain can be changed to a type A domain reproducibly. Even when these domains are expanded, the size of the A domain is larger than the B domain.

Means are provided for generating type A and type B domains and for switching one type of domain to the other, and vice versa. This means generally comprises a means for producing a localized magnetic field which is either in the direction of the stabilizing bias field or opposed to it. A current-carrying coil or a magnetic means (such as permalloy) can be used to produce the magnetic field in a direction substantially normal to the magnetic medium in which the domains exist.

Means are provided for propagating the domains of both types in the magnetic medium. Conventional structure is usually used for the propagation means, although new structure can be easily designed to take account of the properties of these two different types of domains.

Means are also provided for sensing the two different types of domains and for providing output signals representative of these different types of domains. The sensing means generally comprises known sensors, such as magnetoresistive sensors, and the sensors described in copending application Ser. No. 267,877, filed June 30, 1972, now Pat. No. 3,842,407. A display is provided using these two different types of domains. Since the type A domains appear as large bright spots when viewed between nearly crossed polarizers, and the type B domains appear as small hazy areas when using nearly crossed polarizers, the display is realized by providing means for switching the domains from one type to another. For instance, current-carrying conductors are provided in e.g., an $xy$ orthogonal coordinate fashion or in a hexagonal coordinate fashion where domains are located at the intersections of these conductors. Thus, a fully loaded magnetic medium has domains in a plurality of stable positions. Current pulses along selected conductors cause the domains at these locations to change state. When light is incident on the magnetic medium, a pattern will be viewed depending upon the presence of type A domains at selected locations. As an extension of this the type A domains can be expanded into strip domains by the current pulses, to provide large bright areas which can be segments of a character, etc.

Magnetic systems using these different types of magnetic domains can be designed for a variety of purposes including memory, storage, logic, and display. Once the basic functional devices are established, it is easily within the skill of those in the art to utilize these devices for provision of various types of systems.

These and other objects, advantages, and features will be more apparent in the following more particular description of the preferred embodiments.

DETAILED DESCRIPTION OF THE PREFERRED EMBODIMENTS

FIGS. 1, 2A, 2B, and 2C

Figure 1:
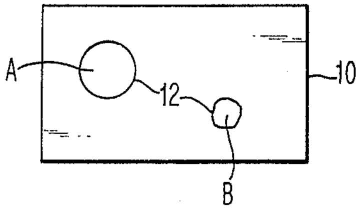
FIG. 1 is a schematic illustration of a magnetic sheet showing two types of magnetic domains therein.

These figures illustrate the concept of two different types of domains in the same magnetic sheet 10. The magnetic sheet can be any bubble domain material, including garnets and orthoferrites. Data will be presented relating to a variety of garnet bubble domain compositions to illustrate the material properties. In FIG. 1, the large domain is a type A domain while the smaller domain is designated a type B domain. As can be seen, the type A domain is characterized by a larger diameter than the type B domain and by a more well defined domain wall 12. The type B domain is smaller in effective diameter and has a domain wall 12 which appears somewhat hazy when viewed by polarized light, using the Faraday effect.

Figure 2A:
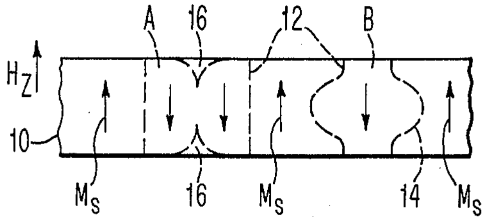
FIGS. 2A – 2C are illustrations of some possible models of the domain wall configurations for explaining the phenomenon of these two different bubble domain types.
Figure 2B:
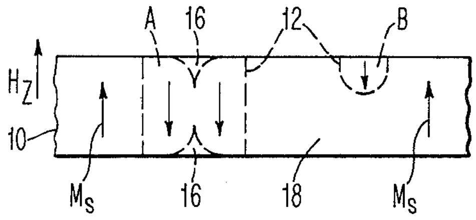
Figure 2C:
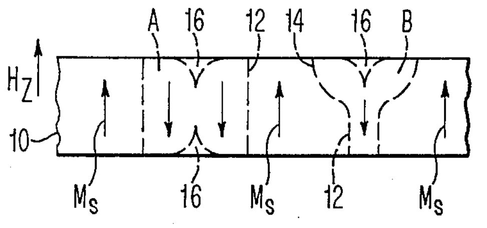

FIGS. 2A – 2C illustrate three possible domain wall configurations for explaining the observed Faraday contrast of these two types of domains. Domains with different sizes are postulated and have different wall configurations. The material properties may be uniform throughout the film thickness in FIG. 2A, but the properties are probably layered in FIGS. 2B, 2C. These different wall configurations enable the total energy of each bubble domain to be the same so that they can coexist in the same magnetic bias field $H_Z$. Consequently in FIG. 2A, the smaller B domain has bulges 14 in its domain wall which increase the wall energy of domain B so that it is the same as that of domain A.

Domain A in FIG. 2A is shown having portions 16 which have the same magnetization direction as the magnetization $M_s$ of the medium 10. These different configurations 16 are postulated because the curve of the Faraday light intensity through domain A versus distance across the domain has sometimes shown a small dip in intensity occurring from approximately the midpoint of the domain.

FIG. 2B illustrates another possible explanation for the coexistence of the two types of domains. In this figure, the type B domain does not extend through the entire thickness of the magnetic material 10. This would account for its hazy appearance when viewed by Faraday transmission. A possible reason for the shallowness of the type B domain is that a composition gradient exists in magnetic material 10. That is, the magnetic properties of material 10 in the area 18 under domain B are not sufficient to support this type of domain. On the other hand, the material properties of the entire magnetic medium 10 are sufficient to support a type A domain.

In FIG. 2C the type A domain is the same as that shown in FIGS. 2A and 2B, while the type B domain extends throughout the magnetic film, but has bulges 14 in its domain wall 12. As with the type A domain, a small region 16 of inverted magnetization is sometimes seen with polarized light.

SAMPLE MATERIALS

As mentioned previously, it should be possible to obtain these different types of domains in any type of bubble domain material. The following table lists three different samples of magnetic bubble domain materials in which the type A and type B domains were observed and manipulated:

TABLE

| SAMPLE NO. | COMPOSITION | (MICRONS) THICKNESS | DOMAIN DIAM. (MICRONS) | | $\pi M_s$ |
|---|---|---|---|---|---|
| | | | B | A | |
| LPED 92 | $Eu_{0.6}Y_{2.4}Ga_{1.1}Fe_{3.9}O_{12}$ | 12 | 9 | 16 | 450 |
| LPED 99 | $Eu_{0.7}Y_{2.3}Ga_{1.1}Fe_{3.9}O_{12}$ | 12 | 3 | 7 | 290 |
| LPE 66 | $Gd_{1.0}Y_{2.0}Ga_{1.0}Fe_{4.0}O_{12}$ | 7 | 2 | 4 | 280 |

The samples with the prefix LPED are those made by liquid phase epitaxy using a dipping technique, which is well known. Those samples labeled with the prefix LPE were also made by liquid phase epitaxy, but a tipping technique was used in which the flux melt is flowed over the substrate. Again, this is a well known process for producing epitaxial garnet films. The films in each case were formed on suitable garnet substrates, which are also well known.

In these magnetic films, the conditions of growth were such that it is likely that the initial layer deposited on the substrate was formed under deposition conditions leading to increased amounts of gallium on the bottom of the magnetic layer 10. This could account for the fact that the type B bubbles do not extend throughout the thickness of magnetic material 10, while the larger type A bubbles do extend throughout the thickness of magnetic material 10.

Generation of Type A and B Domains

Figure 3:
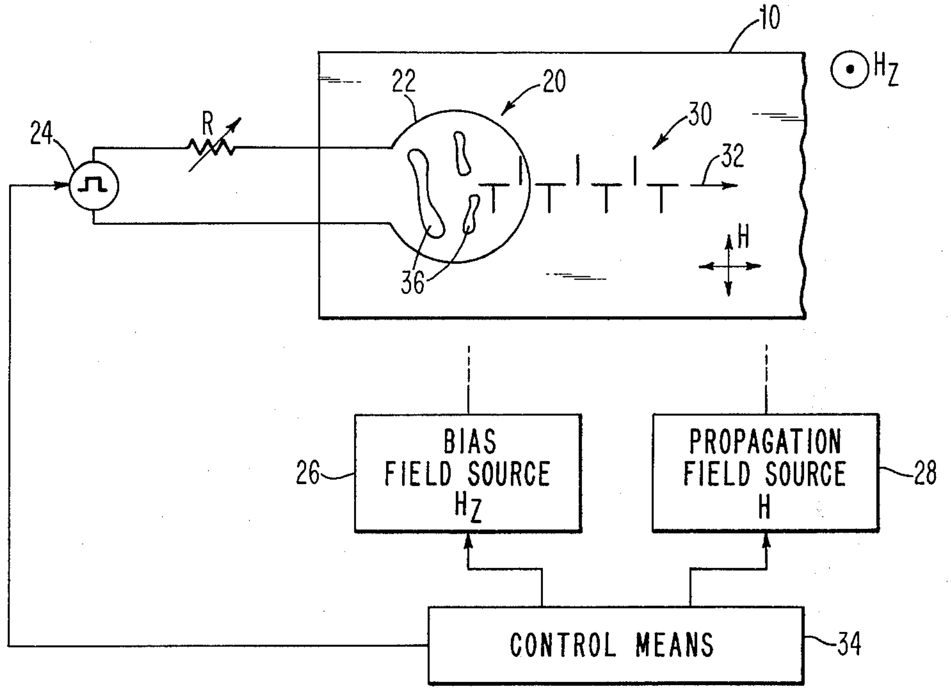
FIG. 3 is an illustration of a type of generation means for providing both types of bubble domains.

FIG. 3 shows an apparatus used to generate type A and type B domains. Where possible, the same reference numerals will be used to describe this figure as were used in previous figures. Accordingly, a magnetic material 10 has located adjacent thereto a means 20 for producing a localized magnetic field substantially normal to magnetic material 10. In this case, the means for producing the localized field is a current-carrying coil 22 which is connected to a pulse current source 24 through a current limiting variable resistor R. Current through coil 22 will produce a magnetic field within the area of coil 22 which is parallel or antiparallel to the bias magnetic field $H_Z$, depending upon the polarity of current in this coil.

As an alternative, the means 20 for producing a localized magnetic field can be a soft magnetic element used in conjunction with a magnetic field H existing in the plane of magnetic material 10. Such a soft magnetic element will produce a localized field substantially normal to magnetic medium 10.

A bias field source 26 is provided for producing the bias magnetic field $H_Z$. As is well known, source 26 could comprise a coil surrounding magnetic material 10, a permanent magnet, or a magnet layer adjacent layer 10 and exchange coupled thereto.

Propagation field source 28 provides a reorienting magnetic field H in the plane of magnetic material 10. Field H is used in conjunction with propagation means 30 to move domains in the direction of arrow 32.

A control means 34 provides triggering and synchronization pulses to sources 26 and 28 and also to the current source 24.

In operation, strip domains 36 exist throughout the magnetic sheet 10 when it is in a demagnetized state. The strip domains are present in the area of coil 22. A Z-bias field $H_Z$ exists and a current pulse is applied to coil 22 to chop strip domains 36 into segments, some of which may be type A domains while some are type B domains. Under the action of the propagation field H and the propagation means 30 (well known permalloy T and I-bars) the type A and type B domains can be propagated in the direction of arrow 32.

For the sample No. LPE 66 as in Table I previously described, a uniform Z-bias of 64–70 Oe was used to stabilize one or both types of domains.

To convert type A domains to type B domains, a current pulse is applied in coil 22. This current pulse has a polarity which will produce a magnetic field which will switch the magnetization direction of the lower portion of a type A domain in the reverse direction (i.e., into the direction of the magnetization of sheet 10). Thus, the type A domain will be converted into a type B domain which does not extend throughout the entire magnetic sheet, or which has a different wall configuration.

The current pulse amplitude is chosen to produce a peak magnetic field suitable for the conversion. In the case of LPE 66 the value for conversion is an amplitude of approximately 50–100 Oe. A single pulse of current may be used or a pulse train is suitable, where the pulse duration is about 10 milliseconds. If a pulse train is used, the frequency of the pulse train can be in the approximate range 10–100 cycles/second. However, a great deal of latitude is possible depending upon the samples chosen. The essence is that chopping of strip domains will produce the type A and B domains within the area of coil 22 and that changing the polarity of a pulse of suitable amplitude will produce the conversion of type A to type B and type B to type A, as the case may be.

In order to convert a type B domain to a type A domain, a current pulse is applied in coil 22 having a polarity to produce a magnetic field oppositely directed to the bias magnetic field $H_Z$. The pulse magnetic field produced by current in coil 22 rotates the direction of magnetization of sheet 10 in the area under domain type B. This will produce a type A domain which extends throughout magnetic sheet 10.

As in the case of switching type A domains to type B domains, the same current pulse values are suitable here. That is, the amplitude, duration, frequency, etc. are the same as those mentioned previously for this sample.

The coil size is arbitrary and was chosen to have a few millimeters diameter. Generally, a coil which will provide about 50 Oe per amp of current through it is suitable.

Systems Using These Types of Domains (FIGS. 4 – 7)

Figure 4:
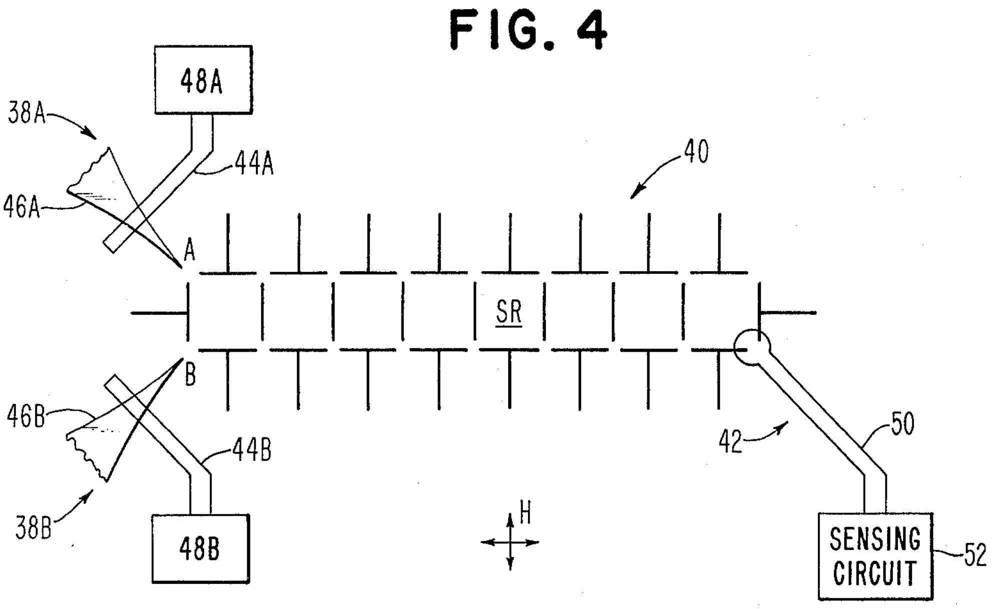
FIG. 4 is a circuit utilizing two types of magnetic domains, illustrating propagation and sensing.

FIG. 4 shows a system for generation and manipulation of type A and type B domains. In this figure, the magnetic medium 10 is not shown for ease of illustration.

The system comprises a source of type A bubbles, generally designated by numeral 38A, a source of type B bubbles, generally designated by the numeral 38B, a propagation means 40, and a sensing means 42.

Source 38A and 38B are comprised of current-carrying conductors 44A and 44B, respectively. Current through these conductors is used to split strip domains 46A and 46B, respectively. This produces type A domains and type B domains which then enter a shift register SR comprised of the propagation elements 40. In this figure, the domain sources 38A and 38B are shown in this fashion, it being understood that the sources will reproducibly provide type A and type B domains in accordance with the discussion in the previous paragraphs. That is, coils are provided to pulse domains formed to ensure that type A and type B domains are provided when required. In FIG. 4, the control means 48A and 48B operate to provide currents of selected polarity in coils 44A and 44B, respectively.

Conventional T and I-bars are used for the propagation means 40. These elements have gaps between them consistent with the propagation of domains of either type A or type B. That is, the gap between successive T and I-bars is sufficiently small to allow propagation of the type B domains. This ensures that a type A domain will also be propagated using this structure. The propagation occurs through the action of the rotating magnetic field H, in a manner well known in the art.

Operation of controls 48A and 48B is used to selectively enter type A and type B domains in the shift register in accordance with the information pattern desired.

The sensing means 42 is shown as a conductor loop 50 connected to sensing circuit 52. This sensing circuit can be a conventional circuit for detecting a flux change or it can be the circuitry described in copending application Ser. No. 267,877, filed June 30, 1972. The flux change due to a large type A domain is different than that due to a smaller type B domain, such that these domains can be directly sensed. Additionally, sensing elements can be arranged in differential schemes to enhance the difference in signal received when the two types of domains are measured. Such means are well known in the art and will not be described further.

If the sensing circuit 52 of copending application Ser. No. 267,877 is used, domains of type A and B are oscillated by current through coil 50 and the dynamic response of the system is measured as explained in that application. Therefore, a shift in resonant peak of the sensing circuit 52 will provide an indication of type A and type B domains.

Magnetoresistive sensing can also be used. In this case, the loop 50 would be replaced by a magnetoresistive sensing element and the sensing circuitry 52 would be that (current or voltage source, etc.) associated with magnetoresistive sensing. Such a sensing technique is amply described in U.S. Pat. No. 3,691,540, which is hereby incorporated by reference.

Figure 5:
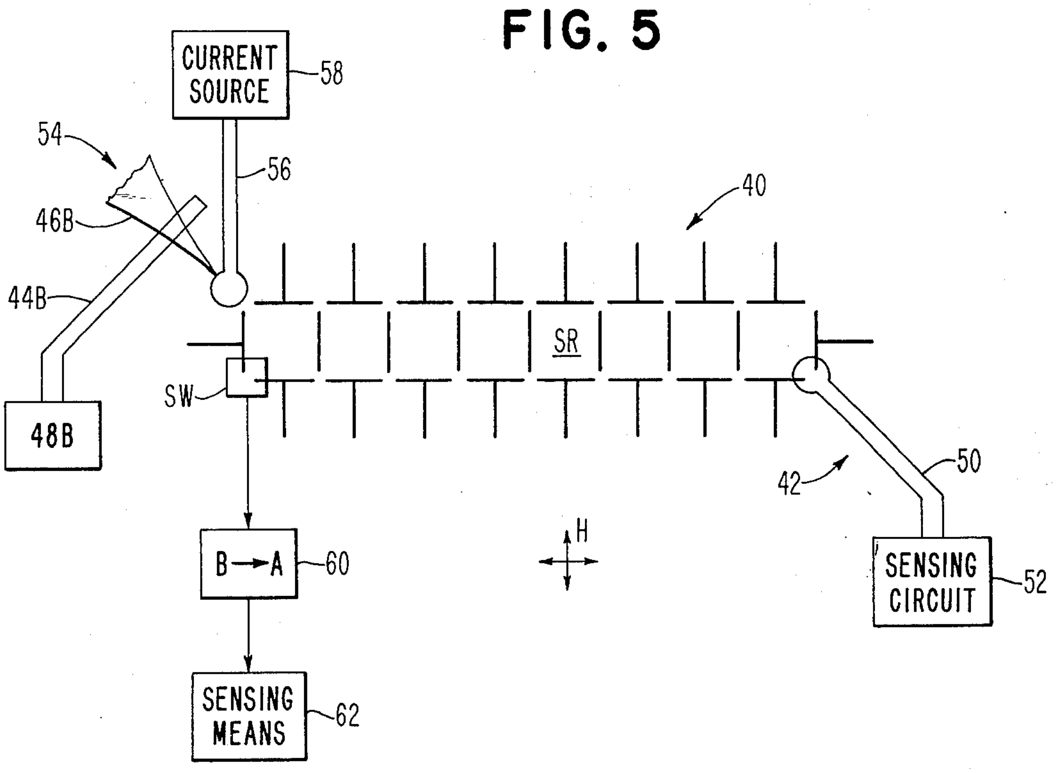
FIG. 5 is another bubble domain system using two types of magnetic domains having a switch therein for changing one type of domain to the other.

FIG. 5 shows a bubble domain system using both types of domains which is in many respects similar to that of FIG. 4. The difference here is that the bubble domain generator 54 provides type B domains which can then be changed to type A domains by current in coil 56. In this manner, a controlled pattern of type A and type B domains can be entered into the shift register propagation elements 40.

As before, generator 54 is comprised of a current-carrying coil 44B connected to a control 48B. This causes splitting of a strip domain 46B to produce type B domains. Coil 56 is connected to a current source 58 which provides currents of either polarity to convert type B domains to type A domains when desired. The sensing means 42 is the same as that used in FIG. 4 and will not be described further.

Since the type B bubble domains are smaller than the type A bubble domains, it may be preferable to store type B bubbles in order to provide a higher density store. The type B bubbles can then be removed from the storage means by a conventional switch, such as described in U.S. Pat. No. 3,701,125. The type B bubbles would then be converted to type A bubbles which will provide a larger signal to a sensing means, such as a magnetoresistive detector. Thus, the component labeled SW in FIG. 5 is a switch of the aforementioned type used to withdraw domains from the shift register. These domains are then propagated to a B-A converter 60 (previously described) before being propagated to a sensing means 62. This provides a high density storage and sensing means.

Figure 6:
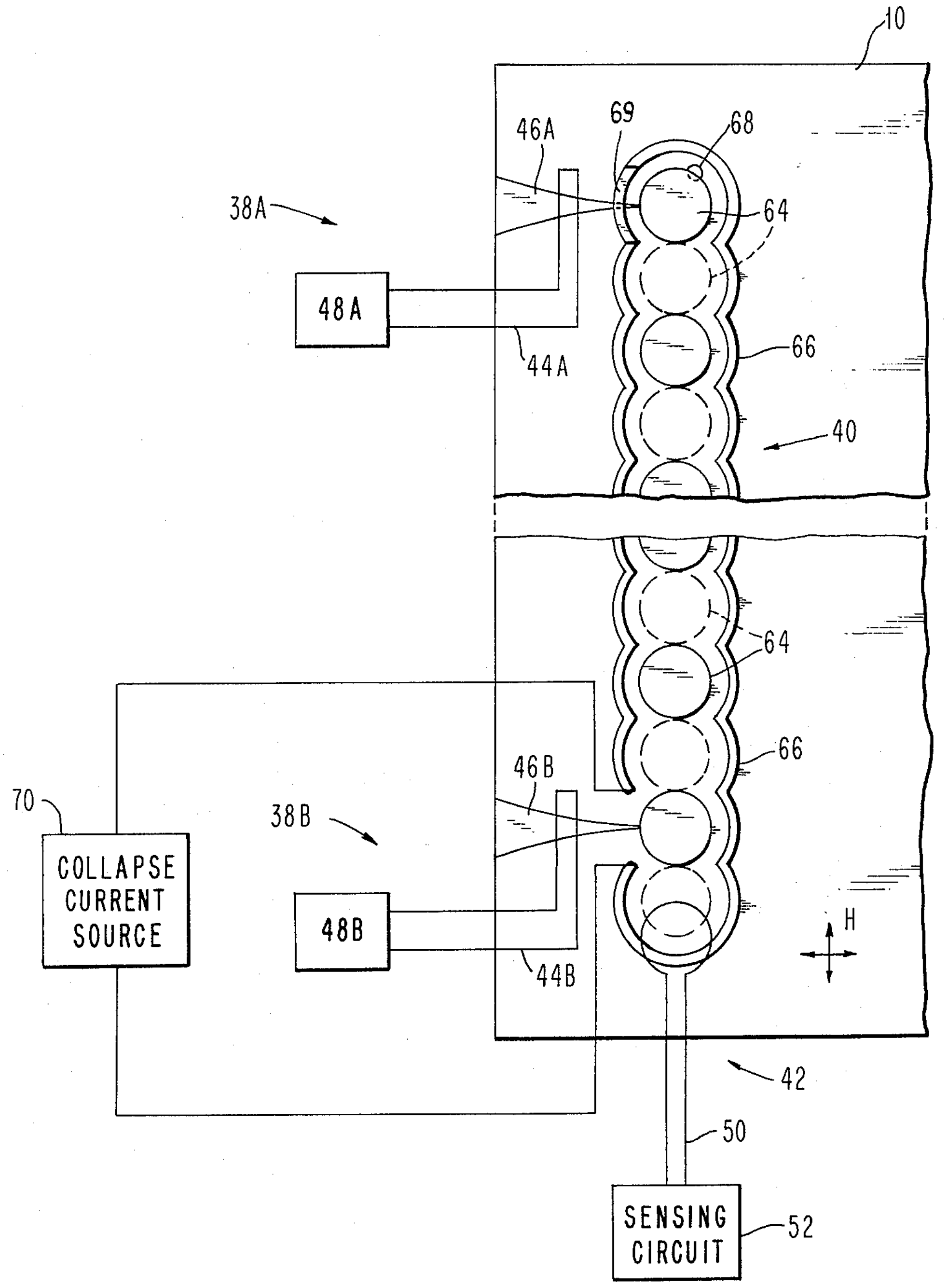
FIG. 6 is a still further bubble domain system using two different types of domains, illustrated with a different propagation means.

FIG. 6 describes another magnetic bubble domain system using different propagation elements. The magnetic sheet 10 has thereon a propagation means 40 comprising permalloy discs 64 which are located on the top and bottom of magnetic sheet 10. That is, alternate permalloy discs 64 are located on opposite sides of magnetic sheet 10, the discs 64 located on the bottom of magnetic sheet 10 being drawn with dashed lines. A permalloy guide rail 66 around the periphery of the discs serves to constrain the movement of domains 68 to the area adjacent the discs 64. Propagation of domains around the periphery of adjacent discs occurs as the magnetic field H rotates in the plane of sheet 10, in a manner well known in the art.

As in previous embodiments, a source 38A provides A type domains while a source 38B provides B type domains. The sources 38A and 38B comprise the same elements as the sources 38A and 38B of FIG. 4 and operate the same way, so thay will not be described in more detail here. It is only sufficient to say that these sources provide domains selectively which are moved by the propagation means 40, in this case the combination of the permalloy discs 64 and guide rail 66.

A sensing means generally designated 42 is provided in the same manner as the sensing means 42 of FIGS. 4 and 5. Accordingly, this sensing means will not be described further here.

Guide rail 66 is usually of a magnetically soft material such as permalloy. As such, it is a conductor. A conducting, nonmagnetic portion 69 is provided near the location where type A domains enter the propagation means 40. Conductor 69 provides an electrical connection to complete the loop comprised of the guide rail 66 and conductor 69. In this manner, a current provided by collapse current source 70 can be used to create a magnetic field which will collapse all domains in the shift register represented by propagation elements 40. Thus, the register may be selectively cleared at any time.

Figure 7:
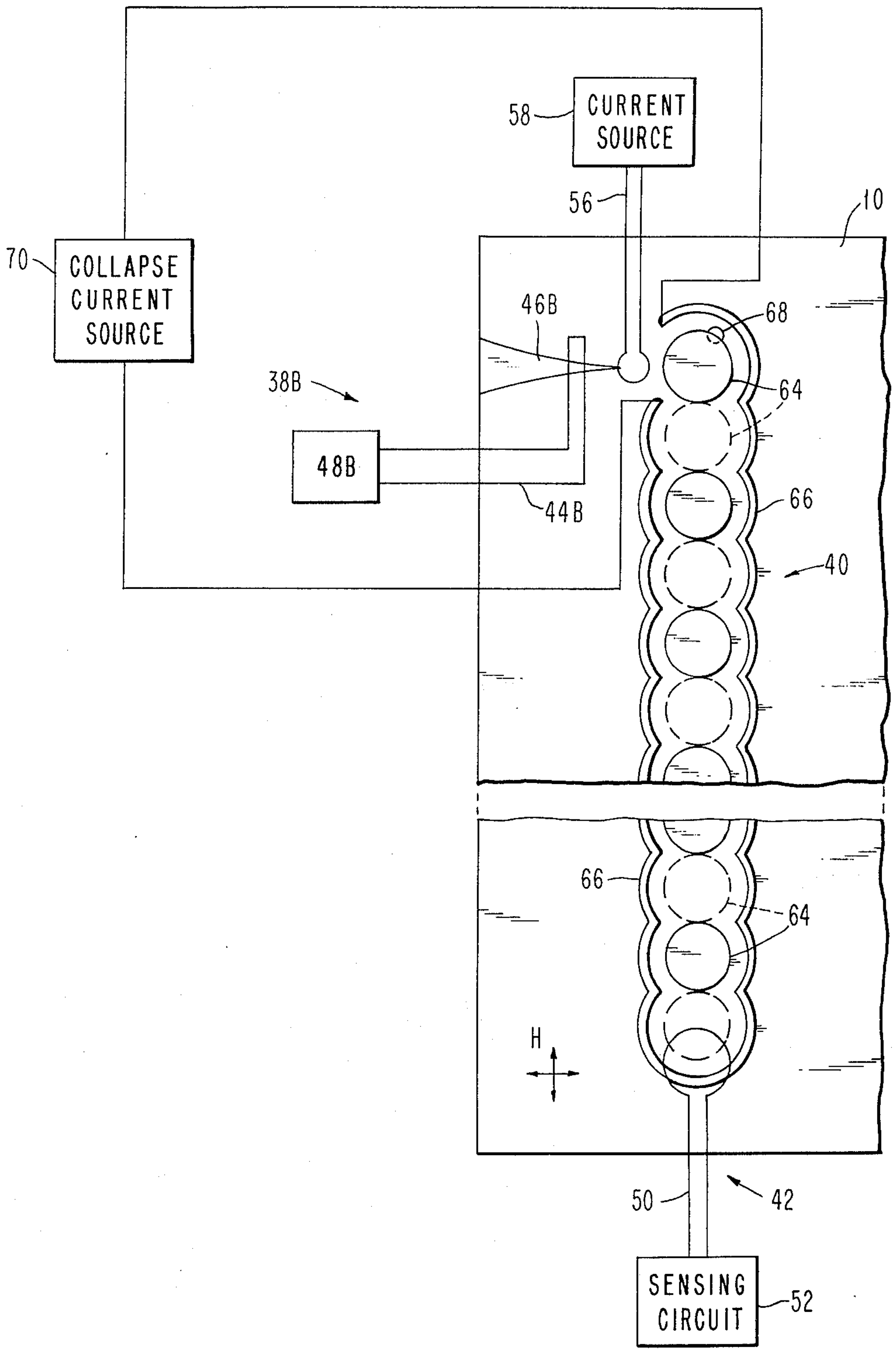
FIG. 7 is a bubble domain system similar to that of FIG. 6, except that means are provided for changing one type of domain to the other and vice versa.

FIG. 7 shows a bubble domain system similar to that of FIG. 6. Therefore, it will not be described in great detail.

FIG. 7 is similar to FIG. 6 except that a single domain source 38B is provided. A coil 56 connected to a current source 58 is provided for selectively changing type B bubbles produced by source 38B to type A bubbles when required. The pattern of domains produced propagates around the periphery of discs 64 in the same manner as that described with respect to FIG. 6. In contrast with the embodiment of FIG. 6, that of FIG. 7 uses only a single domain source and converts domains by the means 56 and 58. A collapse current source 70 provides a current in permalloy guide rail 66 for collapsing domains in the register when it is desired to clear information from the register.

A sensing means 42 which is the same as the sensing means described previously is also utilized in the embodiment of FIG. 7.

FIG. 8

Figure 8:
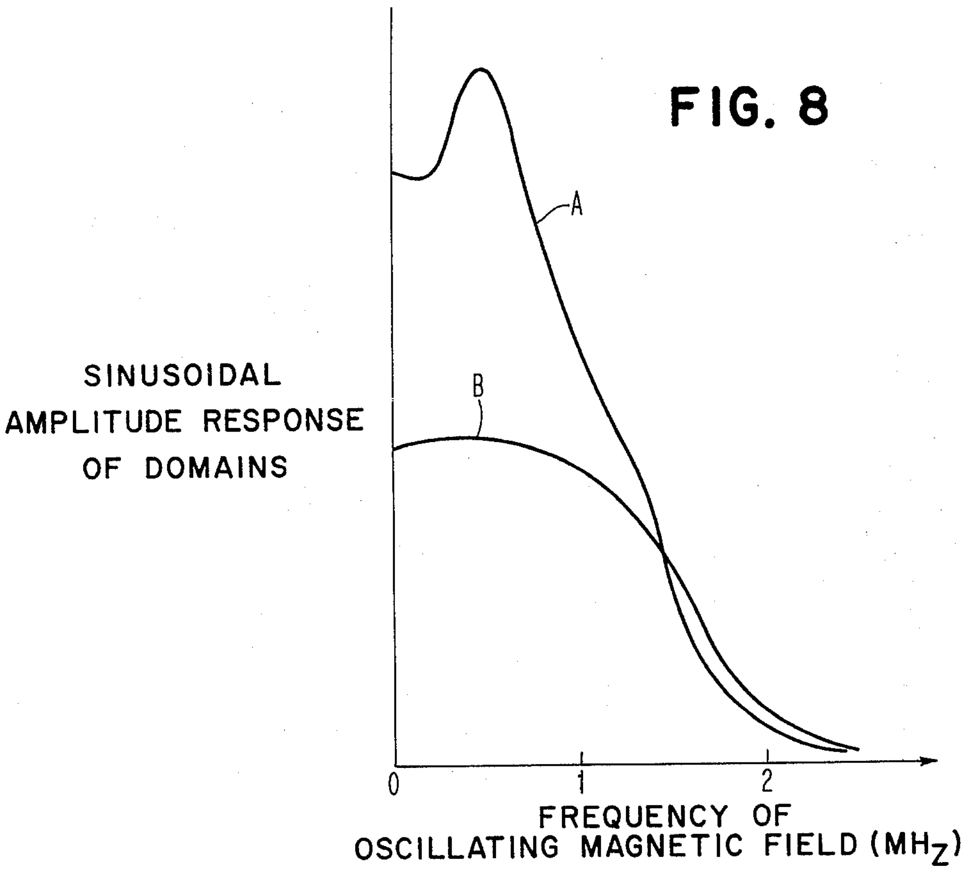
FIG. 8 is a plot of the amplitude of wall displacement of the two different types of domains versus the frequency of a constant amplitude sinusoidal Z-field signal applied to oscillate hexagonal arrays of type A and B domains.

As was mentioned, the sensing means 42 can comprise the resonant sensing scheme described in aforementioned copending application Ser. No. 267,877. As an indication of the utility of a dynamic sensing scheme, FIG. 8 shows the sinusoidal amplitude response of type A and type B domains in an oscillating magnetic field substantially normal to the magnetic sheet in which these domains exist. Such an oscillation field can easily be provided by an alternating current in a coil such as is included in the sensing apparatus 42. From FIG. 8, it is apparent that the dynamic response of a type A domain wall is different than the dynamic response of the type B domain wall. These differences are easily manifested in the resonant circuitry of aforementioned copending application Ser. No. 267,877, when the sensing circuit 52 includes such resonant circuitry.

Display Applications

Figure 9:
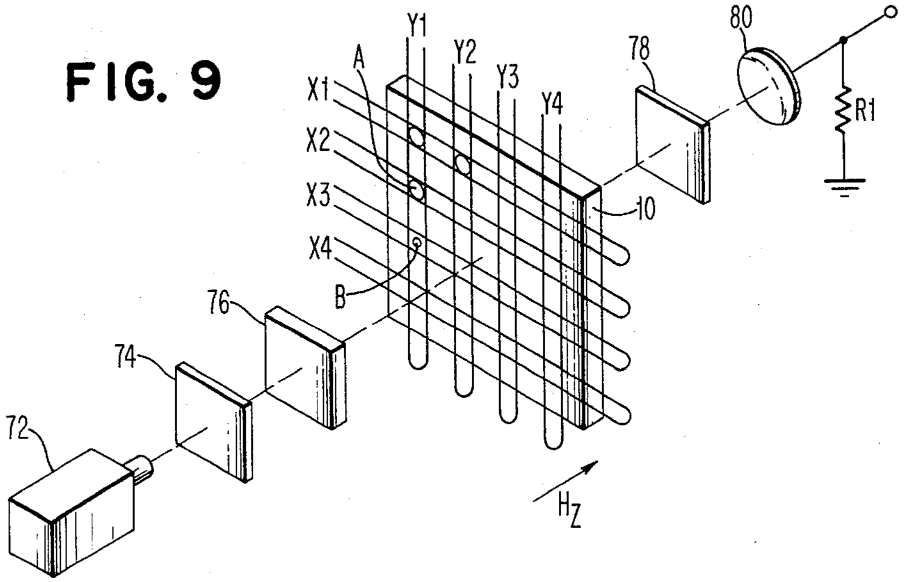
FIG. 9 shows a display device using these different types of domains for effecting transmission and reflection of light.

FIG. 9 shows a display using both type A and type B domains. These different domains have different light transmission and reflection properties, and the type A domains generally will provide a large bright spot while the type B domains will provide a small spot which is quite hazy and dark. This feature is used to provide the display of FIG. 9.

In more detail, the display is comprised of a magnetic sheet 10 in which type A and type B domains can exist under the same magnetic bias field $H_Z$. The domains are located at stable positions defined by the intersection of X conductors X1, X2, etc., and Y conductors Y1, Y2, etc. For instance, a type A domain is shown at the intersection of conductors X2 and Y1 while a type B domain is shown at the intersection of conductors X3 and Y1. Currents in the X and Y conductors provide magnetic fields in the region of their intersection which can be used to change type A to type B domains and vice versa in accordance with the previous teaching of this application. Thus, information can be provided to the X and Y conductors to establish any pattern of type A domains or type B domains in magnetic sheet 10.

A light source 72 is provided, which could for instance be a laser. The light from source 72 passes through a polarizer 74 and a light deflector 76. The light then impinges on the various magnetic domain locations in sheet 10 and, after passage through sheet 10, passes through analyzer 78 before striking photocell 80. A voltage is developed across resistor R1 of photocell 80 which indicates whether or not the type A or type B domain was at the spot where light was incident on the magnetic sheet.

In the embodiment shown in FIG. 9, light is deflected to various locations in magnetic sheet 10 to provide selective illumination in a scanning mode. However, it should be realized that a complete pattern of type A or type B domains can be created in sheet 10, after which polarized light is incident upon the entire area of sheet 10. In this manner a viewer will be able to see a pattern of any numeral or character on the magnetic sheet 10. In this case, the light source would provide a large beam of polarized light to illuminate the entire area of sheet 10 in a manner well known in the art.

In summary, Applicants have shown useable magnetic bubble domain systems utilizing two types of magnetic domains which have separate and distinct properties. Various apparatuses can be designed using these two types of domains, and such applications include memory, storage, display, and logic. Information can be represented as two types of domains rather than as the presence and absence of domains as was previously done.

Additionally, various devices can be substituted for the devices shown in the embodiments described herein. For instance, any of several known means can be used to provide localized magnetic fields for transforming the type A and type B bubbles into one another. These various means can be used with the display of FIG. 9 as well as with the storage and propagation embodiments shown in the other figures. Also, a small magnetic field producing means can be hand operated across the magnetic sheet 10 of FIG. 9, in the manner of a light pen, to write in information which then is displayed when light is incident upon the magnetic sheet. Accordingly, such a device could be used as a teaching device in educational systems.

What is claimed is:

1. A magnetic domain system comprising:

a magnetic medium having uniform thickness and uniform magnetization over its area in which different types of isolated magnetic bubble domains having single, closed walls can exist simultaneously in the absence of any structure external to the magnetic medium and in the same magnetic bias field directed along the magnetization direction of said magnetic medium, said bubble domains having different sizes when viewed optically, means for generating said bubble domains having different sizes in said magnetic medium.

2. The system of claim 1, including means for illuminating said magnetic medium with electromagnetic radiation.

3. The system of claim 2, where said means for illuminating includes a laser.

4. The system of claim 2, where said system also includes means for converting domains of one size to domains of a second size, said first and second size domains existing simultaneously under the same magnetic bias field in said magnetic sheet.

5. The system of claim 1, including means for manipulating domains having different size in said magnetic medium without changing domains of one type to another type.

6. The system of claim 1, where said means for manipulating includes means for propagating said different types of domains and means for sensing said different types of domains.

7. The system of claim 6, where said means for propagating said domains includes magnetically soft elements located adjacent said magnetic medium and a source of a reorienting magnetic field in the plane of said magnetic medium.

8. A magnetic domain system using different types of magnetic bubble domains having single, closed domain walls, comprising:

a magnetic medium having substantially uniform thickness and a uniform chemical composition across the area of said medium in which bubble domains having different size exist simultaneously in the absence of any structure external to said magnetic medium and under the same magnitude of magnetic bias field directed anti-parallel to the magnetization of said domains, propagation means for propagating said different bubble domains in said medium, sensing means for detecting said domains.

9. The system of claim 8, where said propagation means is comprised of a pattern of magnetically soft elements located adjacent said magnetic medium, and a source of a reorienting magnetic field in said magnetic medium.

10. The system of claim 8, where said means for detecting said domains includes magnetoresistive sensing elements.

11. The system of claim 8, including generating means for selectively producing domains having different sizes in said magnetic medium.

12. The system of claim 11, where said generating means includes means for creating localized magnetic fields substantially normal to said magnetic medium.

13. The system of claim 8, further including light means for illuminating said magnetic medium with electromagnetic radiation for display of said domains in said magnetic medium.

14. The system of claim 8, where domains of one type extend only partially through the thickness of said magnetic medium.

15. A magnetic bubble domain system using bubble domains of two different types, where domains of a first type are larger than domains of a second type when viewed optically, said system comprising:

a magnetic medium in which said two types of isolated bubble domains having single, closed walls exist simultaneously in the absence of any structure external to said magnetic medium and under the same magnitude of magnetic bias field directed along the direction of magnetization of said magnetic medium, said magnetic medium having the same magnetization and unit formula of chemical composition across the area of said medium, means for manipulating said two different types of domains.

16. The system of claim 15, including means for generating domains of said first and second types in said magnetic medium.

17. The system of claim 15, including means for converting domains of said first type to domains of said second type.

18. The system of claim 15, including means for converting domains of said said second type to domains of said first type.

19. The system of claim 15, including light means for illuminating said magnetic medium with polarized light.

20. The system of claim 15, including means for propagating domains of said first and second types in said magnetic medium.

21. The system of claim 15, including means for sensing domains of said first and second types.

22. A magnetic bubble domain system using bubble domains of two different types each of which has a single, closed wall structure, where domains of a first type are larger than domains of a second type when viewed optically, said system comprising:

a magnetic medium having substantially the same value of magnetization throughout its lateral area and having substantially uniform thickness in which said two types of bubble domains can exist simultaneously in the absence of any structure external to said magnetic medium and under the same magnitude of magnetic bias field, means for generating bubble domains of said two different types in said magnetic medium, means for manipulating bubble domains of said two different types in said magnetic medium, means for sensing said two different types of magnetic bubble domains.

23. The system of claim 22, including means for converting domains of one type to domains of the other type.

24. The system of claim 23, including light means for illuminating said magnetic medium.

25. A magnetic bubble domain system using single, closed wall bubble domains of two different types, where domains of a first type are larger than domains of a second type when viewed optically, said system comprising:

a magnetic medium in which said two types of bubble domains can exist simultaneously in the absence of any structure external to said magnetic medium and under the same magnitude of magnetic bias field directed oppositely to the magnetization direction of said bubble domains, said medium having the same magnetization and compositional formula throughout its lateral area, and being of substantially uniform thickness, conversion means for converting domains at selected locations from one type to the other type, light means for illuminating said magnetic medium with polarized light.

26. The system of claim 25, where said conversion means includes means for providing localized magnetic fields at selected locations in said magnetic medium.

27. A magnetic bubble domain apparatus, comprising:

a magnetic medium having uniaxial anisotrophy in which magnetic bubble domains having single, closed domain walls unbounded by the magnetic medium can exist, said medium having substantially uniform thickness and magnetization across its lateral area, and means for generating different types of said bubble domains in said magnetic medium, said different bubble domains having different structures of their magnetic single walls where said different bubble domains are isolated from one another and are stably supported at the same time in said magnetic medium in the absence of any structure external to said magnetic medium and under the same magnitude of magnetic field parallel to the magnetization of said magnetic medium on said different types of magnetic bubble domains.

28. The apparatus of claim 27, in which magnetic bubble domains of one type have a different size than magnetic bubble domains of another type when viewed optically.

29. A magnetic bubble domain apparatus, comprising:

a magnetic medium in which magnetic bubble domains can exist, said medium having substantially uniform thickness and magnetization and having the same chemical formula throughout its lateral area.

propagation means for moving magnetic bubble domains having closed, single walls in said magnetic medium, said domains being of two different types having different wall properties which can exist simultaneously and isolated from one another in said magnetic medium in the absence of any structure external to said medium, wherein said propagation means can move said different types of domains in said magnetic medium in the presence of a uniform bias field substantially normal to the plane of said magnetic medium, generating means for producing said two different types of bubble domains in said magnetic medium.

* * * * *